United States Patent [19]

Davidson et al.

[11] Patent Number: 4,809,260

[45] Date of Patent: Feb. 28, 1989

[54] TELEPHONE EXCHANGE

[75] Inventors: David M. Davidson, Codicote; John R. Bungard, London; Robert Gatward, Woodford Green, all of England

[73] Assignee: STC PLC, London, England

[21] Appl. No.: 59,581

[22] Filed: Jun. 8, 1987

[30] Foreign Application Priority Data

Jun. 13, 1986 [GB] United Kingdom ................. 8614404

[51] Int. Cl.$^4$ ............................................. H04Q 11/04
[52] U.S. Cl. ...................................... 370/58; 370/68.1
[58] Field of Search ...................... 370/58, 68.1, 110.1

[56] References Cited

U.S. PATENT DOCUMENTS

| 4,575,839 | 3/1986 | Ogata et al. | 370/58 |
| 4,644,528 | 2/1987 | Ahmad et al. | 370/58 |
| 4,654,845 | 3/1987 | Mukerji | 370/58 |
| 4,656,621 | 4/1987 | Cooperman et al. | 370/58 |

Primary Examiner—Douglas W. Olms
Assistant Examiner—Min Jung Kim
Attorney, Agent, or Firm—Lee & Smith

[57] ABSTRACT

An automatic telephone exchange, such as a PABX, includes a number of group control units (GCU1 to GCU4) each of which is a simplified version of the system of U.S. Pat. No. 4581733. These are connected via respective PCM highways to a central switch, which is an electronic time space switch, and a central controller. The central controller does the major part of the call setting and control, all calls being set up via the central switch.

9 Claims, 6 Drawing Sheets

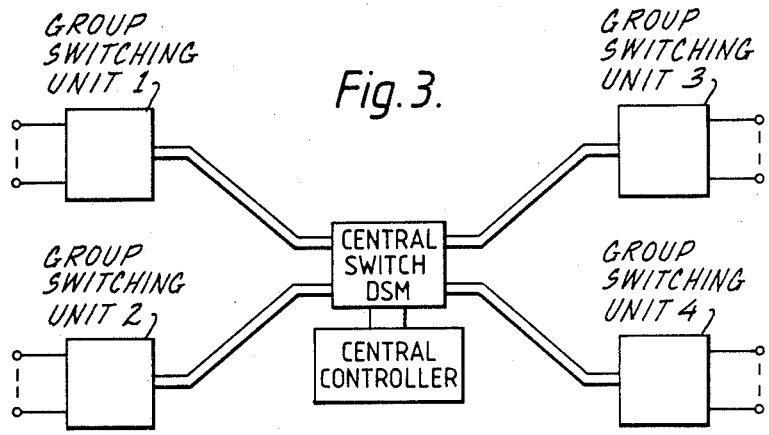
Fig. 3.
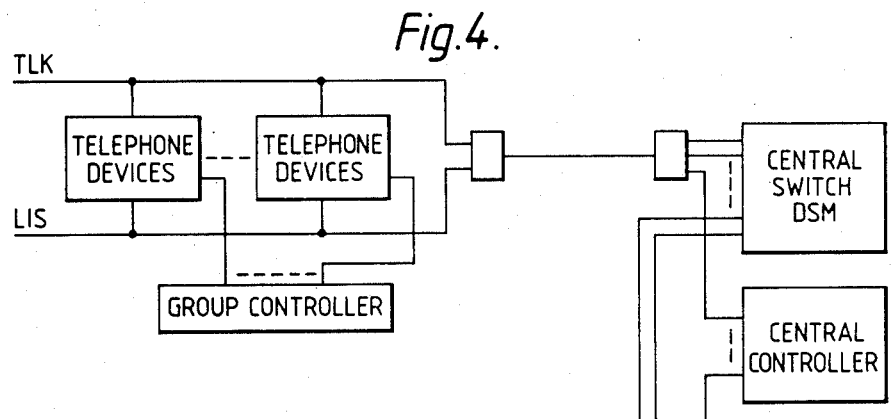
Fig. 4.
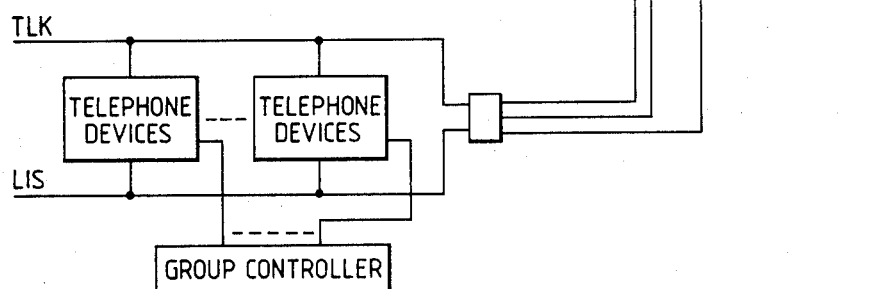

TELEPHONE EXCHANGE

FIELD OF ART

This invention relates to automatic telecommunication switching systems, especially but not solely to private automatic branch exchanges (PABX's).

BACKGROUND OF THE ART

A modern trend in such systemns is towards the use of electronics, and especially to the use of time division multiplex (TDM) and pulse code modulation (PCM). One such system has been described in British Patent Specification No. 2067050B (Western Electric), and the system described therein uses a number of switching networks each of which serves a number of subscribers' lines connected to a common central switching unit.

An object of the present invention is to extend the usefulness of such systems.

SUMMARY OF THE INVENTION

According to the present invention there is provided an automatic telecommunication switching system, in which connections are set up in time division multiplex (TDM) manner using pulse code modulation (PCM), in which the system includes a plurality of group switching units (GSUs) each of which serves a group of system terminals such as subscribers' lines, tie lines and trunks to a remote exchange, control means associated with each said GSU, a central control processor (CCP) coupled separately to the control means of each said GSU and arranged to control the establishment of all calls through the system, digital co-ordinate switching means associated with and under the control of the CCP, and digital links interconnecting the GSU's and said digital switching means in a star-like manner, wherein the digital links also provide the physical means for the couplings between the CCP and the control means of the said GSUs, wherein connections are set up under the control of the CCP and the control means associated with the GSU or GSUs to which the terminals to be interconnected are connected, each said connection being set up via a said digital link from the GSU to which one of the terminals involved in a call is connected to the digital switching means and therefrom via said digital link to the GSU to which the other of the terminals involved in that call is connected, wherein there are enough TDM slots provided for all of the subscribers served by the same GSU to be talking at once, so that the system is fully non-blocking, and wherein all signalling between different ones of the terminals of the system is controlled by said CCP and is conveyed over the same physical transmission path as is used for the conveyance of speech.

BRIEF DESCRIPTION OF THE DRAWINGS

FIG. 3 is a block diagram of another exchange with four group control units, which embodies the invention.

FIG. 4 is a somewhat more detailed explanatory block diagram of an exchange embodying the invention.

The exchanges to be described herein follow in general the principles of the exchange described in U.S. Pat. No. 4,581,733, and they each use two or more sub-units, known as group switch units (GSUs), each of which is a simplified version of the exchange of the above Patent Specification. FIG. 1 is a somewhat simplified block schematic of an exchane following the principles of the above Specification, but somewhat modified.

DESCRIPTION OF A SYSTEM SUCH AS THAT OF U.S. PAT. NO. 4,581,733

Figure 1:
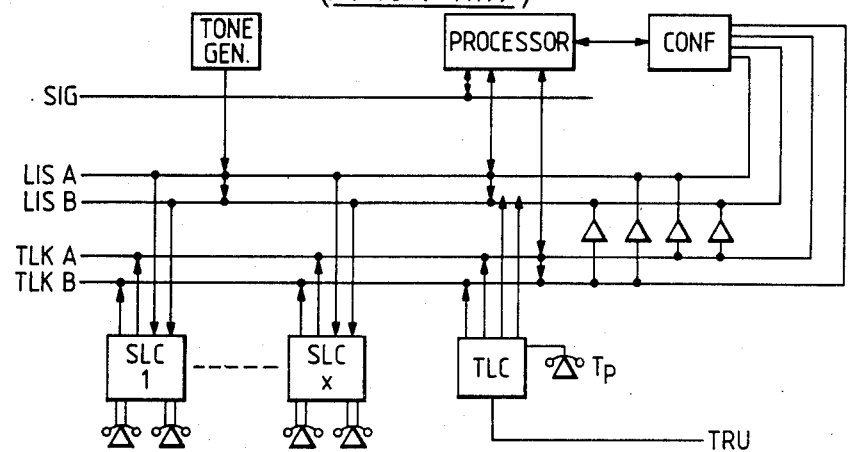
FIG. 1 is a simplified block schematic of an exchange generally similar to that of U.S. Pat. No. 4,581,733 (Sarson et al).

The exchange shown in FIG. 1 has a set of twenty subscribers' line cards such as SLCl, SLCx, each of which serves two subscribers' lines, these being four-wire lines. There is also a trunk line card TLC, which serves a single trunk to a remote public exchange, or a tie line to another private exchange. This card also has a telephone $t_P$ connected to it; in the event of power failure at the exchange, TLC disconnects the trunk from the rest of the exchange and connects it to the telephone $T_P$, so that communication with the outer world can be maintained.

The exchange has four PCM speech buses, two, TLKA and TLKB used for speech outgoing from the line cards or the trunk card, and two, LISA and LISB, used for speech incoming to those cards. These PCM buses each convey 32 channels in TDM manner. There is a set of buffers via which TLKA is connected to LISA and LISB, and TLKB is connected to LISA and LISB. Signalling is conveyed on a signalling bus SIG, so that the speech buses only carry speech, and also tones. These tones, which come from a generator TONE GEN are applied to the busses LISA and LISB, and are conveyed on two TDM channels or slots, 00 and 01, of the 32 PCM channels on the bus SIG. Tones when required are switched to the various lines under control of the PROCESSOR, the signals for doing this being conveyed via the bus SIG.

Call setting and other operations are described in some detail in the above-mentioned Patent Specification, so are not described in detail here. However, when a two-way call is to be set up, two separate time slots on the PCM highways are allotted to that call, one for each subscriber line involved. Thus assume a call between line (or port) 32 and line (or port) 47. Port 32 is given the first free time slot for it to transmit over bus TLKA, while port 47 is given the next free time slot for it to transmit over TLKB. These could, for instance, be channel 02 for port 32 and channel 03 for port 47. When the call is established, speech passes at channel 02 from bus TLKA via the buffers onto both LISA and LISB and also at channel 03 from TLKB via the buffers onto both LISA and LISB. Port 32 is then set to receive from LISA at channel 03 and port 47 is set to receive from LISB at channel 02. All of this occurs under PROCESSOR control. Thus all four busses are actually used.

One conference circuit CONF is provided; this can set up a three-way conference, using six time slots, as described in the above Patent Specification. This conferencing technique is also described in somewhat more detail in U.S. Pat. No. 4,566,096 (Sarson et al).

DESCRIPTION OF PREFERRED EMBODIMENTS

Figure 2:
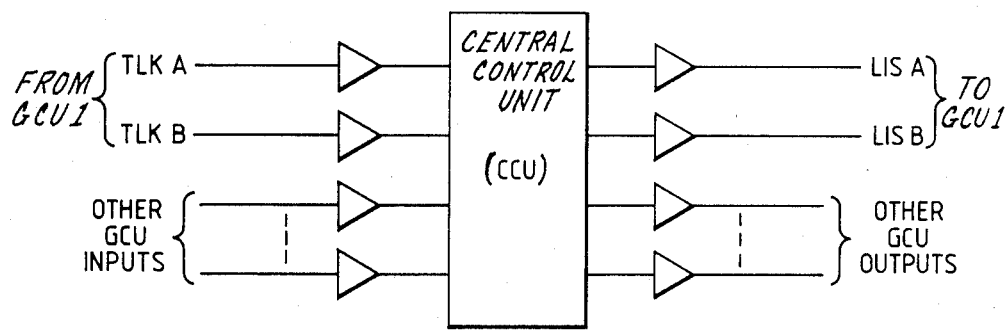
FIG. 2 is a schematic representation of one exchange embodying the invention.

In extending the system in accordance with our present invention, there are two or more group units, GSU1 to GSU4, FIG. 3, each in essence similar to the exchange described above. Within each such unit there are a number of line cards (not shown in FIG. 3), each serving two lines, and of each such pair of lines one is connected to PCM busses LISA and TLKA and the other is connected to busses LISB and TLKB. These busses are shown in FIG. 2, but not separately in some of the other figures. Thus each such port transmits PCM speech on only one of the busses of its group control unit. The busses are interconnected by a digital switch or DMS included in the block CCU. This is the block designated CENTRAL SWITCH DS M in FIG. 3. In one system with only two group switches, channels 00 and 01 on TLKA carry the tones, which are switched via the central digital switch to channels 00 and 01 on the listen busses LISA and LISB. All of the other channels are then available for calls.

We now consider the establishment of a two-way call, e.g. one between port 20 connected to LISA and TLKA and port 57 connected to LISB and TLKB. In this case, channel 02 is dedicated to port 20 on TLKA and LISA, while port 57 has channel 29 on TLKB and LISB. Thus port 20 transmits on channel 02 on TLKA while port 57 transmits on channel 29 on TLKB. The digital switch DMS switches data from TLKA channel 02 to LISB channel 29, and from TLKB channel 29 onto LISA channel 02. Thus all the communications channels are available for use.

Conferencing uses a special conference circuit which is connected by two extra PCM busses to the digital switch. In FIG. 2 the busses TLKA, TLKB, LISA, LISB for group control unit GCU1 are shown. All channels to be conferenced are switched by the switch from the talk busses on to the listen bus to the conference circuit. The conference circuit compares the channels and outputs the summated results of the comparisons onto the talk bus to DMS, which switches the result on to the appropriate channels on the listen bus LISA and/or LISB.

Another exchange to be described, which has more than two Group Switch Units (GSUs) uses a number of group control units, each of which can house up to 30 two-port cards with one port connected to LISA and TLKA and one to LISB and TLKB. These busses are interconnected as shown in FIG. 2 via a central control unit CCU, which includes switching and control equipment. The switching equipment, which is the DMS referred to above, switches voice data through to the listen bus which gives access to the wanted port's group control unit.

In this case, channel use is slightly different. Thus in each group control unit, channel 00 on all four busses is used for frame information while channel 01 on TLKB and LISB is used for signalling information. All the other channels are thus available for speech connections.

A two-way call is set up in a manner generally similar to that described above, with the switching effected within the central control unit CCU. As an example, we consider a call between port 117 connected to LISA/TLKA on group control unit (GCU) 1 and port 20 connected to LISB/TLKB on GCU2. Port 20 has channel 02 allotted to it on TLKA and LISA in GCU1, while port 117 has channel 29 on TLKB and LISB on GCU2. Port 20 transmits speech data onto channel 02 of TLKA of GCU1, while port 117 transmits onto channel 29 of TLKB of GCU2. The DMS, which is in the block CCU, switches the data from channel 02 on TLKA-GCU1 to channel 29 of LISB-GCU1, and from channel 29 of TLKB-GCU2 to channel 02 of LISA on GCU1. Port 20 is then set to receive from LISA on channel 02 and port 117 to receive from LISB on channel 29.

Conferencing is done, as will be seen, as described above. However, tones are conveyed on another PCM bus in the switching equipment, with cadencing as required. When a port needs one of the tones, it is switched via the above-mentioned DMS onto the appropriate time slot channel.

In a telephone exchange to which FIG. 2 relates, a number, e.g. 7, of group switch units is connected in "star" manner to a central control unit CCU, which is modular to facilitate system expansion. The connections between the group units and the CCU are made in "four-wire" manner, via separate talk highways TLK and listen highways LIS. Each of these pairs of highways has a link interface card at each end, and the highways convey PCM speech and data (if any), also signalling using one channel reserved for that purpose.

The links between the GCUs and the CCUs are optical fibre links, which permits the use of cheaper electronics than would be the case if electrical links were used. Further, in view of the high bandwidth available in optical fibre links, one such link can be in effect multiplexed to convey either two GO PCM systems or two RETURN PCM systems. Optical fibre links also have the merit that they are not subject to electro-magnetic interference.

It will be appreciated that in some systems it may be preferred to use metallic connections.

The various talk and listen (often referred to as GO and RETURN) highways are, in the relatively simple system with only two GSUs, interconnected via a conference card. When conferencing is in use the connections to the conference card are made via the switching equipment DMS of the CCU.

In the present multi-GSU system the GO and RETURN PCM busses are, at least in the switching regions, separate, with interconnections for the calls set up via a PCM central switch in the CCU. The central switches are represented by the digital matrix switch DMS, FIG. 6, or the digital matrix switches DMSa to DMSd, FIG. 4. This gives 128×64 kb/s channels on each GSU-CCU link, 64 each way. Thus up to 60 subscribers per GSU can be engaged in calls. Of the other channels one is used for inter-processor connections (i.e. signalling), two are used for frame synchronisation and one is spare.

Note that each line card which serves two subscriber's lines and each trunk card, has its own microprocessor, which microprocessors are themselves controlled by another microprocessor in its GSU. Those latter are controlled by the CCU. Inter-processor communication uses a 19.2 kb/s asynchronous link, encoded on to a 64 kb/s channel between the GSU and the GCU. This is on one of the PCM streams, most of which convey speech data. PCM talk busses ae multiplexed at the GSU and listen busses at the CCU to reduce connections per link to a minimum of two.

Figure 10:
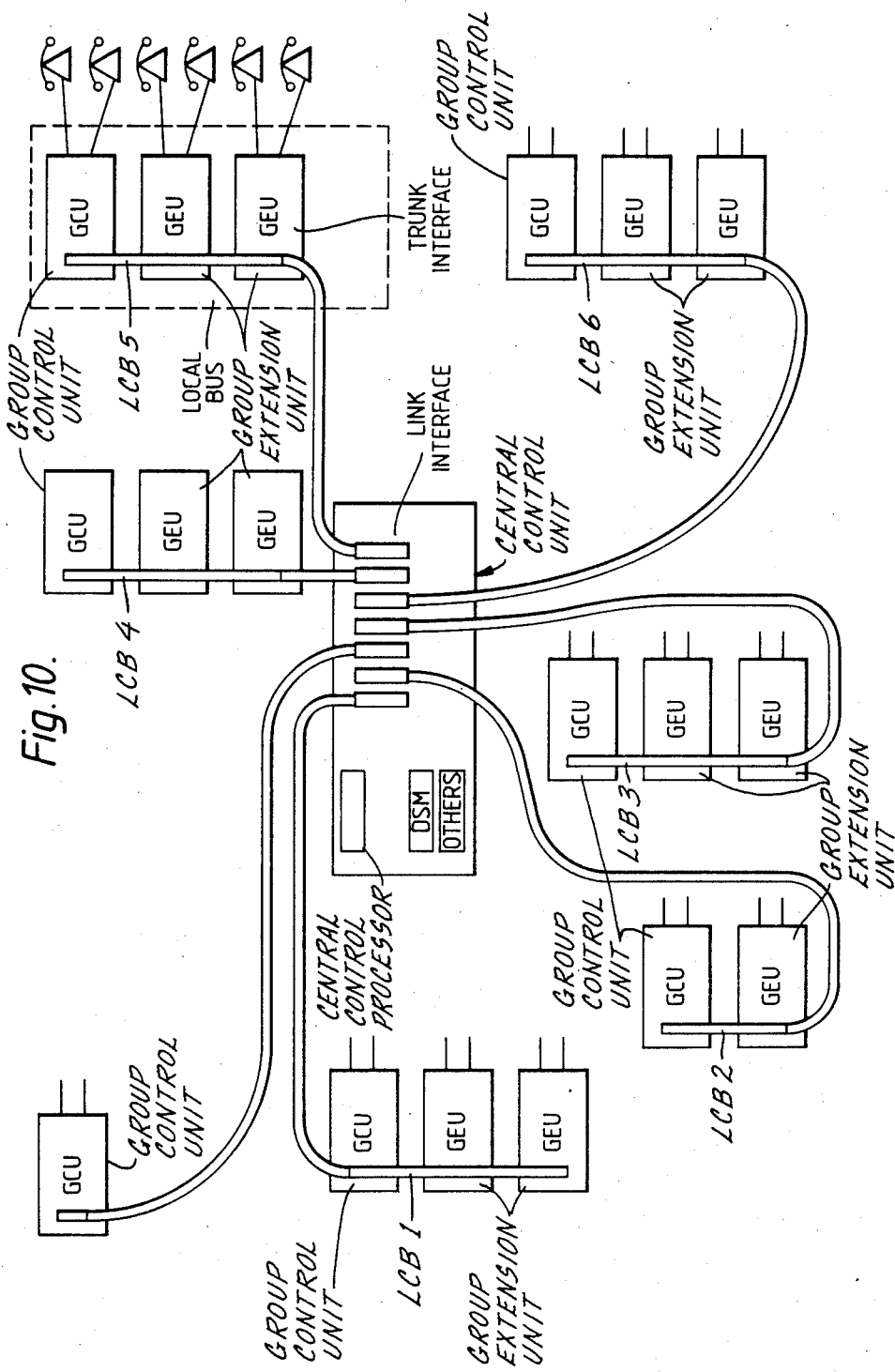
FIG. 10 is a schematic representation of an exchange with seven GSUs.

A GSU, see FIG. 10 includes a control unit GCU serving up to twenty terminals, tie lines, trunks, etc., with a sixty-port communications card. It can have up to two group extension units GEUs, each of which serves up to 20 lines, etc. There is a local communication bus such as LCB2, FIG. 10 to interconnect the control unit and the GEUs, also local PCM busses within the GCU's and GEU's. A link interface card interfaces to a link from the GCU to the CCU, such a card being usually on a GEU, but on the basic unit if the GCU does not have any GEUs. A GCU operating on its own, or a GCU with one or two GEUs, is regarded herein as being a GSU.

The central control unit CCU referred to above includes a central control processor (CCP), which cooperates for call setting with the processors of the GCUs. This will be described below with reference to FIG. 5. This processor includes EPROM and RAM, and also four duplex 300/600/1200/2400 baud serial input-output channels. There are also interrupt drivers, 18, FIG. 5, used to interrupt the CCP on receiving data from a connected terminal, or after having sent data to a connected terminal. It also has up to seven link interface cards for CCU-GCU communications. Associated with it, is a digital PCM switch 11, FIG. 5, for up to seven GCU links, a real-time clock circuit, and PCM clocks. The switch referred to above as the DMS is a digital switch matrix which gives a maximum of 512×512 connections between 16 input and 16 output lines.

Conferencing is effected via the CCUs PCM switch DMS, the conference circuit being connected via one input line and one output line to the switch DMS. It permits a wide range of different conference arrangements.

FIG. 3 is a general block diagram of a system with four GSUs, GSU1–GSU4, each connected to the central switch with which is associated a central controller. Microprocessors are used in the GSUs as well as the central controller, and inter-processor communication is via the same physical paths as are used for the speech to be handled.

FIG. 4 is another simplified representation of the arrangement of the various units in one version of the exchange which uses metallic links with physically separate talk and listen highways. The PCM central switch is, as will be seen later, a Time-Space switching matrix.

Figure 5:
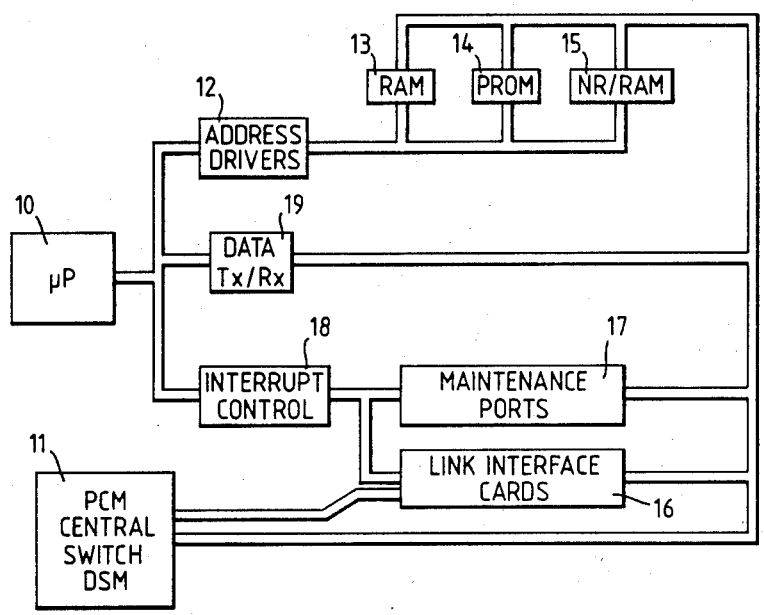
FIG. 5 shows schematically a central control unit in an exchange embodying the invention.

FIG. 5 shows in simplified form the arrangement of the CCU processor. Here the microprocessor 10 is an 8086 microprocessor, which controls the PCM central switch 11. This processor has associated with it address drivers 12, which control memory devices 13, 14, 15 for the various stored information needed for call setting and control. These include random access memories, such as device 13, a non-volatile random access memory such as 15, and also programmable read only memories (PROMs) 14. Any one of them may if needed have a memory extension associated with it.

The process 10 also has data transmission and reception drivers 19, and interrupt control circuits 18 associated with it. These provide the links between itself and maintenance ports 17, link interface ports 16, and the PCM switch 11.

The information from and to the group units, i.e. signalling and also PCM speech, reaches the central unit via link interface ports such as 16. In the system being described, there may be up to seven GSUs and thus up to seven cards in the box 16.

The clock generator (not shown) is a CMOS clock generator referenced by a 15 MHz crystal, which produces a 5 MHz clock for the microprocessor, and a 2.5 MHz clock, subdivided for other system clocks.

The central processor memory is made up of 128K bytes of RAM 13, 128K bytes of NVRAM (non-volatile random access memory) 15 and 512 Kbytes of PROM 14.

The central control unit also includes a watch dog timer which checks whether the system is functioning, especially in quiescent periods. This is done by repeated checks using a timer, which only times out if a fault exists. One simple device of this type is described in U.K. No. 212844B (STC).

The group controller includes, for call detection, an arrangement which polls its lines 10 times per second, as in the system of FIG. 1. When a change is detected, i.e. on-hook to off-hook or vice-versa, "dialling" etc., a message is sent to the processor in the GCU of the GSU in which the change was detected, and this processor sends the data therefor along a serial link to the CCU, FIG. 5. This link is the one referred to above as being set up via the speech path. The central control unit does its call processing and receives the messages from the GCUs, with interrupts occurring when something has happened. It also sends messages to the GCUs of the various GSUs to cause call setting operations thereat, such as the application of ringing to the wanted line.

Where the system is parented on to a digital public exchange, e.g. a System X exchange, it is connected thereto via a 32 channel PCM link. This link is connected directly to the central switch (the DMS) via a suitable interface. Hence it is to some extent treated like a link from a GSU to the central unit. At this interface and under processor control, signalling and similar information is extracted from the bit stream.

The CCU has power up and power down facilities (not shown). In either case, an asynchronous reset is applied to the clock generator's reset input. There it is internally synchronised to the 5 MHz processor clock, and applied to the microprocessor reset input. It is also applied to the link interface cards, and to all counting and other circuits which need reset on power up.

The reset in response to power down is to prevent the microprocessor from writing to the non-volatile RAM while power is being lost. Imminent collapse of the power supply is detected, synchronised to the microprocessor clock, and applied to the microprocessor via the clock generator. This gives a controlled power down.

Figure 6:
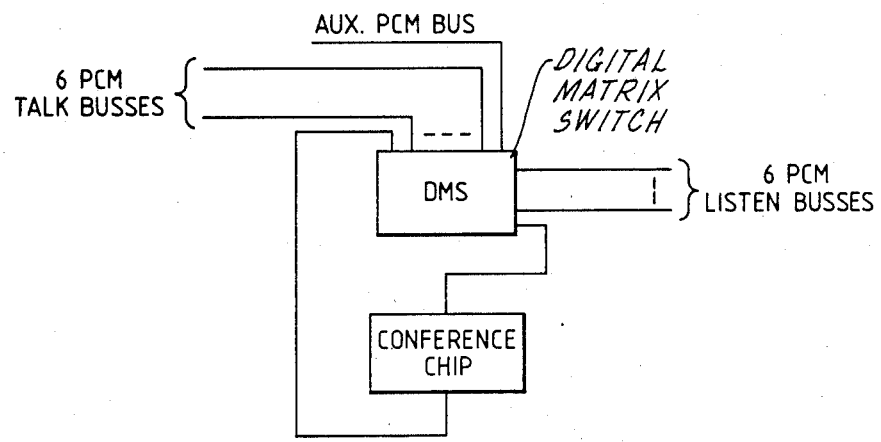
FIG. 6 shows a PCM central switch used in a moderately-sized exchange system embodying the invention.

FIG. 6 shows a PCM central switch for an 180 port system, which uses as its switch a single digital switching matrix (DMS) chip. This, as already mentioned is a "time-space" switching arrangement. Note that it interconnects talk and listen busses, and that there is also another PCM bus via which tones are applied to such listen time slots as necessary. The conference chip, like the DMS chip, is also a commercially-available chip.

Figure 7:
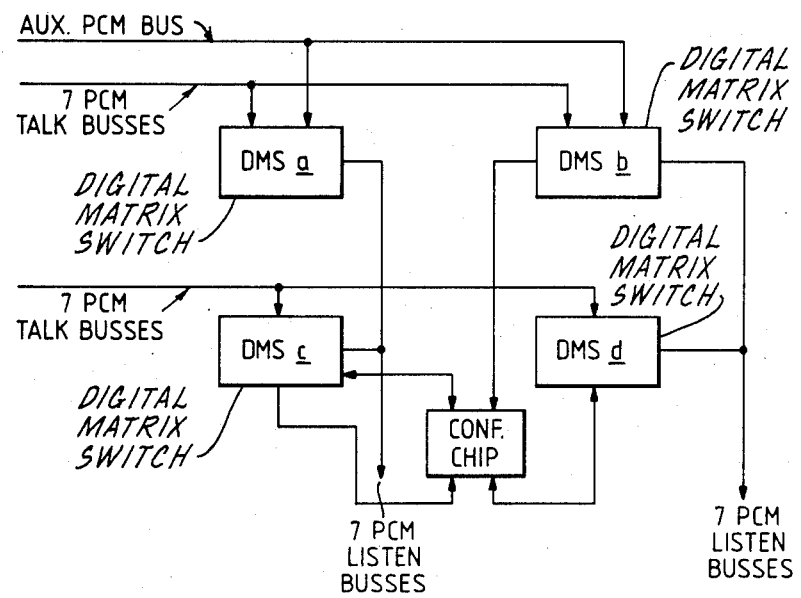
FIG. 7 shows the PCM central switch for a somewhat larger exchange embodying the invention.

FIG. 7 shows the PCM central switch for a 420 port system, which uses four DMS chips DMSa, DMSb, DMSc and DMSd so connected that any talk bit stream can be connected to any listen bit stream, via only one chip.

In the switch, in both FIGS. 6 and 7, serial input data is converted into parallel format in the DMS, where it is stored in a speech memory at a location determined by input bus number and PCM channel number. A control memory in the DMS chip maintains correspondences between input and output channels and busses, and data is converted back to serial form before it is "outputted" from the chip.

The form of conference chip used herein allows a maximum of 32 conferees, in various combinations, e.g. 1×32, 10×3, etc. with for each conference equal priority to all parties. Input attenuation on a programmable basis is available if needed.

Each channel in a conference is sent to the conference chip conf. chip from the appropriate DMS chip, with information as to attenuation and noise suppression values if needed, converted internally from the companded format (A law or μ law) used on the PCM busses into linear form, and added to the other parties' linear codes. Receiving parties get information by subtracting from this sum what was stored on the previous frame. Then we have linear to companded conversation, followed by output back to the switch. A tone can be sent out in place of PCM speech to tell users that a conference call is in progress by "outputting" a high-low bit alternation.

CCU-GCU processor communication is via a 19.2 kbps RS232 data link, decoded on the line interface card by a "data codec" onto one of the 64 Kb/sec PCM time slots/channels.

Figure 8:
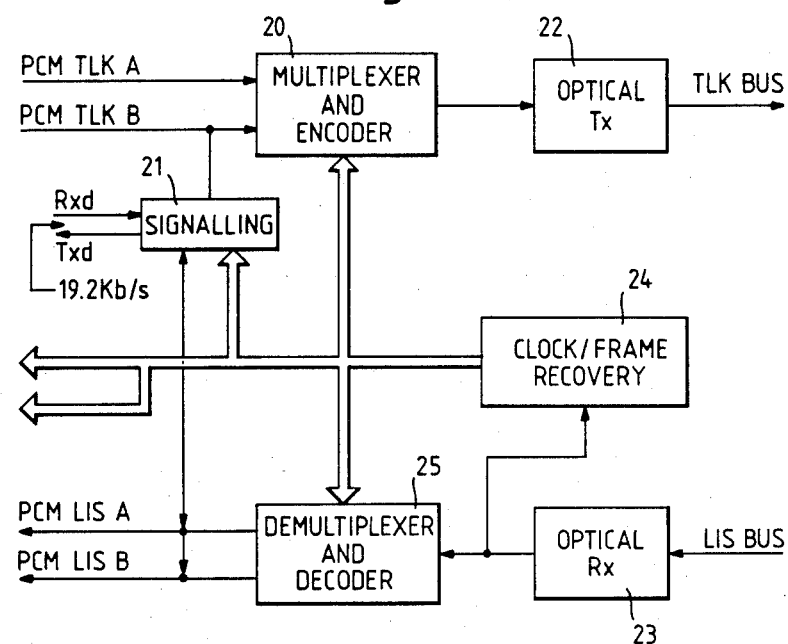
FIG. 8 shows in block diagram form a GCU link interface.

We now refer to FIG. 8, which is a block diagram of a link interface card at the GCU end of an inter-unit PCM link. This, with a similar card at the CCU end, provides the interface to the two systems via two optical fibres. This card multiplexes and transmits two 2.048 Mb/sec PCM talk channels from the GCU on one optical fibre; it also receives data from the CCU via another optical fibre and decodes it into two PCM listen channels, plus signalling data. Each such channel also contains clock and frame information encoded in, using Manchester coding.

As will be seen, the talk channels PCM TLKA and PCM TLKB are connected to a multiplexer and encoder 20 which also receives locally generated signalling from the block 21. The multiplexed and enclosed bit stream is applied to an optical transmitter 22 in which it is modulated onto a laser (or LED) generated light beam for sending over the TLK highway.

The incoming bit stream arrives via the LIS highway at an optical receiver 23, from the output of which clock and frame recovery is effected in the block 24. The output from the receiver 23 passes to a demultiplexer/decoder block 25, from which the two listen busses PCM LISA and PCM LISB are generated.

The reason for using Manchester coding is that, although it doubles the effective bit rate it always gives an edge in the middle of a bit cell from which the clock can be reconstructed. Frame information is encoded into the link as a violation of this code during the first transmitted cell of a frame. During this cell, both halves are transmitted as a low, so there is no edge in the middle of the cell. This missing edge can then be detected at the receiving end.

We have stated above that the link interface card at the CCU end is generally similar to that at the GCU end; one difference between the two is that the one at the CCU end includes a delay circuit which ensures that the total delay in the GCU-CCU loop is kept to a fixed time of 125 secs. This, which is itself a wellknown technique, ensures that for the inputs and the outputs from the central switch, proper synchronisation is maintained. Another point of interest is that when the multiplexing of the bit streams is effected, PCM LISB is delayed by half a clock cycle.

Figure 9:
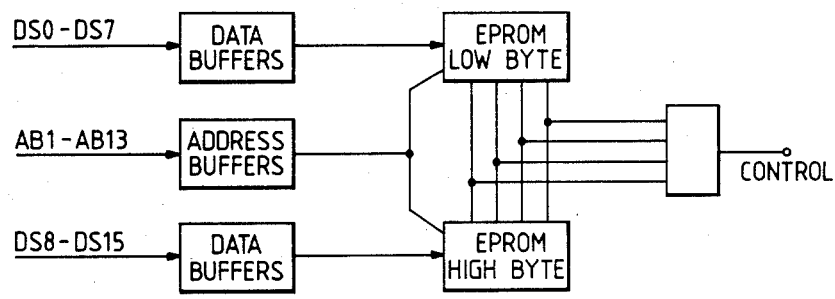
FIG. 9 shows schematically part of the memory arrangements of the central control unit of an exchange embodying the invention.

We now consider the EPROM peripheral board which, shown in FIG. 9, is one of the modules of the processor's memory. This provides 256 kBytes of EPROM memory organised in four separately-addressable 64 KByte segments. The information to be stored is in 16 bit form, and arrives via the DS0-DS7 inputs for the low byte and the DS8-DS15 inputs for the high byte, the information being received in the blocks labelled DATA BUFFERS. Note that each of the EPROM blocks shown can include four modules to make up the 256 KBytes, there being blocks for EPROM LOW BYTE and EPROM HIGH BYTE, as labelled in FIG. 9. These modules and their contents are separately addressed from the address bus input AB-1-AB13 via the Address Buffers. The DS inputs are 8-bit wide parallel inputs and the AB inputs are a 13 bit wide parallel input. The DS inputs are uni-directional, and writing in is effected under control of the CONTROL input.

The arrangement of the NVRAM part of the memory is similar to that of the EPROM part, with the exception that the type of memory differs. It provides the facility for equipping up to 128 KBytes of RAM, i.e. 64 Kbytes per card. In this case, as both read in and read out are needed, the connections which correspond to AB are bi-directional.

A similar arrangement to that just described is used for other portions of memory.

The PROM addressing for the provision of tones uses counters.

Music, supplied when a call is on hold, is routed to the auxiliary PCM bus from internal or external sources as needed.

FIG. 10 is a generalised block diagram of an exchange which embodies the invention in which the GSUs are of different size, ranging from one with only a GCU serving 20 lines up to ones with a GCU plus two GEUs.

We now consider briefly the operations involved in setting up a call. When a subscriber at one of the GSUs off-hooks, the processor serving his card, which card carries two line circuits, allocates a free channel to that caller on his associated PCM TLK bus. This calling condition is detected in the course of the regular polling of the lines of that GSU. When such a calling condition is detected a message is sent to the central control CCU.

At the CCU this interrupts the processor to cause a return message to be sent calling for the wanted number. This number as received at the caller's line circuit is sent to the CCU digit by digit so that the CCU builds up the wanted number. When this number is complete the CCU sends a message to the wanted line circuit to cause the line appropriate thereto to be tested for its free or busy condition. If it is busy a message to that effect is sent back to the CCU, which in turn sends a busy message to the calling line circuit, and this is done by applying busy tone thereto. If the wanted line is free, the arrival of the message thereat causes ringing to be applied to it. In addition, a message indicating that the wanted line is free is sent back to the CCU. This latter then causes a ringing tone to be applied at the calling line.

When the wanted party replies, a message to that effect is sent to the CCU, and ringing and ringing tone are terminated.

When either party hangs up at the end of the call, the hanging up is detected by the appropriate line circuit. This causes a message to be sent to the CCU which causes call break down.

In certain exchanges embodying the invention each of the DMS chips is an SGS MO88 chip, and the conference chip is an SGS M116 chip, but other chips can be used if desired.

We claim:

1. An automatic telecommunication switching system in which connections are set up in time division multiplex (TDM) manner using pulse code modulation (PCM), in which;

the system includes group switching units (GSU's) each of which serves a group of system terminals such as subscribers' lines, tie lines and trunks to the remote exchange, and control means associated with each said GSU;

the system also includes a central control processor (CCP) coupled separately to control means of each said GSU and arranged to control the establishment of all calls through the system, and digital co-ordinate switching means associated with and under the control of the CCP;

the system further includes digital links interconnecting the GSU's and said digital switching means in a star-like manner, said digital links also providing the physical media for the couplings between the CCP and the respective control means of said GSU's;

all connections through the system are set up under the control of the CCP and of the control means associated with the GSU or GSU's to which the terminals involved in the said connections are connected;

each said connection is set up via a said digital link from the GSU serving one of the terminals involved in that connection to the digital switching means and therefrom via one of said digital links to the GSU serving another one of the terminals involved in that connection, each one of said connections being set up via the digital switching means whether the said connection is an inter-GSU connection or an intra-GSU connection;

the digital links provide sufficient TDM slots to ensure that all of the subscribers served by the same GSU can be talking at once, so that the system is fully non-blocking; and all signalling between different ones of the terminals of the system is controlled by the CCP and is conveyed over the same physical transmission path as is used for the conveyance of speech.

2. A system as claimed in claim 1, and wherein all of the said signalling between a said GSU and the CCP is transmitted over the digital link in one 64 Kb PCM channel provided by a TDM slot over that link.

3. A system as claimed in claim 1, wherein the clocks used for PCM generation at the GSUs are reconstituted from the time date sent over the digital links, so that all of the PCM information in the GSUs is synchronised with the PCM information in the central control means and the centrally-located digital switching means.

4. A system as claimed in claim 1, wherein tones are generated centrally at the central control means under the control of the CCP, they being then inserted into the PCM bit streams centrally.

5. A system as claimed in claim 1, wherein the connections between the GSU and the central control means are so multiplexed that it is only necessary to make two connections therebetween for a single call involving two of said terminals.

6. A system as claimed in claim 1, wherein the digital links are optical fibre links with separate optical fibres used for the two directions of transmission.

7. A system as claimed in claim 1, wherein the digital links are optical fibre links with the two directions of transmissions between a said GSU and the central control means and the digital switching means multiplexed into the same said link.

8. A system as claimed in claim 1, and which includes conference switching means associated with the digital switching means and coupled thereto via metallic digital linking means.

9. A system as claimed in claim 1, and in which the GSU's are two in number.

* * * * *